Sept. 17, 1963    J. M. BOOTH    3,104,018
DEVICE FOR POSITIONING NESTED CUPS
Filed April 3, 1961    4 Sheets-Sheet 1
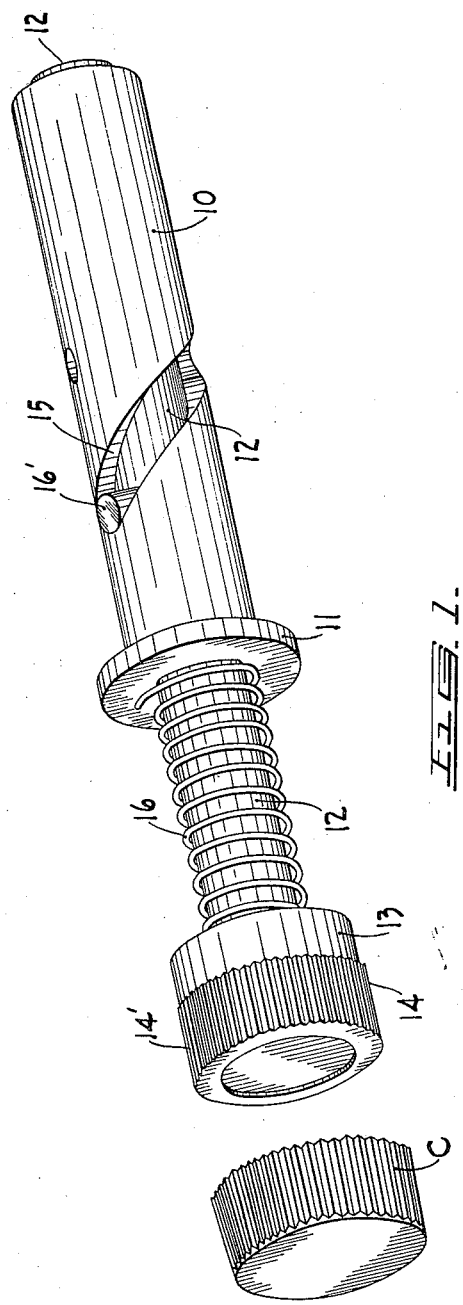
Inventor
John Morton Booth
By Stevens Davis Miller & Mosher
Attorneys Sept. 17, 1963 J. M. BOOTH 3,104,018
DEVICE FOR POSITIONING NESTED CUPS
Filed April 3, 1961 4 Sheets-Sheet 2
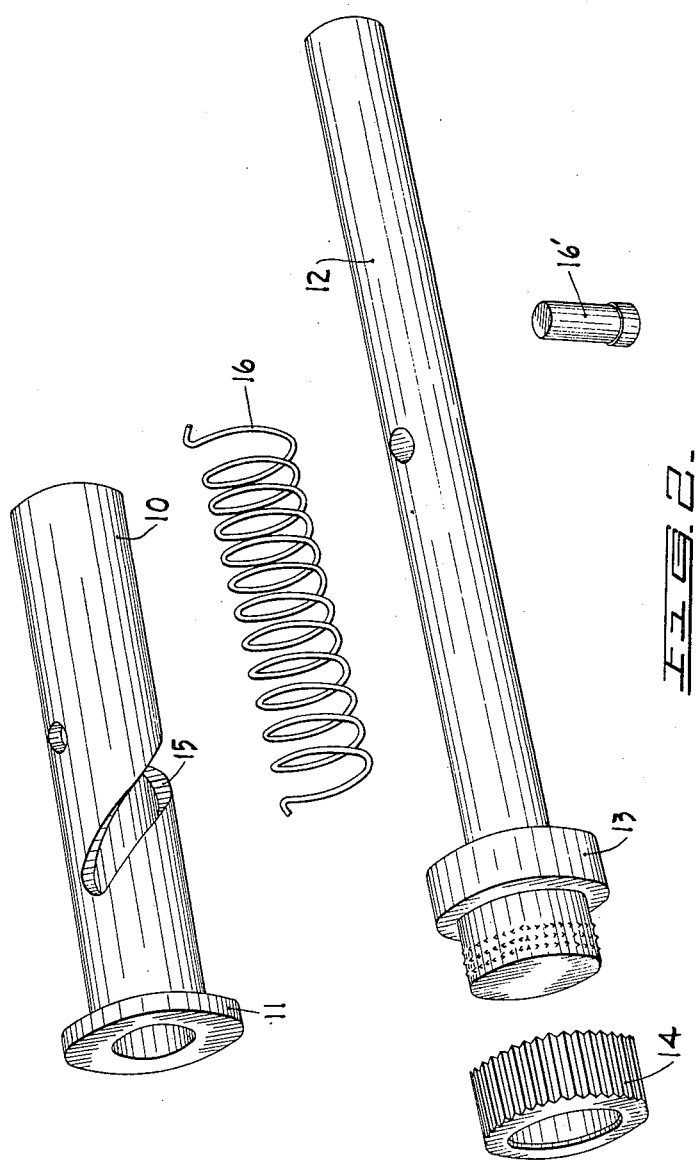
Inventor
John Morton Booth
By Stevens Davis Miller & Mosher
Attorneys Sept. 17, 1963    J. M. BOOTH    3,104,018
DEVICE FOR POSITIONING NESTED CUPS
Filed April 3, 1961    4 Sheets-Sheet 3
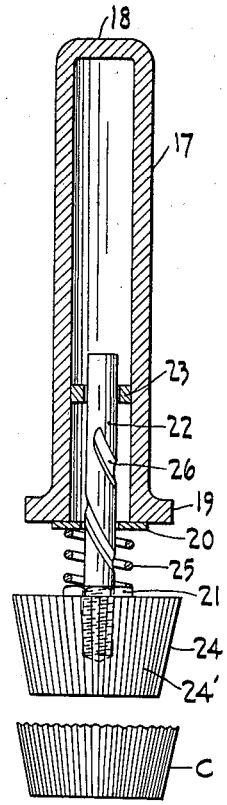
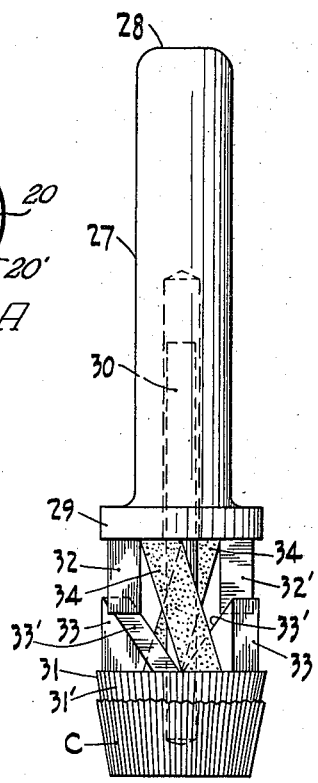
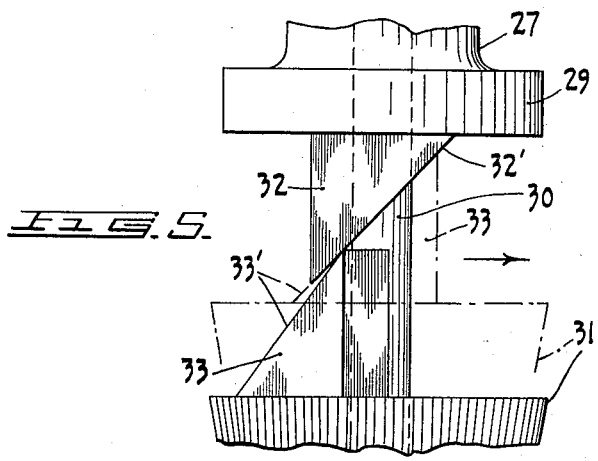
Inventor
John Morton Booth
By Stevens Davis Miller & Mosher
Attorneys Sept. 17, 1963

J. M. BOOTH 3,104,018

DEVICE FOR POSITIONING NESTED CUPS

Filed April 3, 1961

Inventor
John Morton Booth
By Stevens Davis Miller & Mosher
Attorneys

United States Patent Office 3,104,018
Patented Sept. 17, 1963

3,104,018
DEVICE FOR POSITIONING NESTED CUPS
John Morton Booth, Rockingham, Halifax, Nova Scotia, Canada, assignor to Moirs, Limited, Halifax, Nova Scotia, Canada, a body corporate
Filed Apr. 3, 1961, Ser. No. 100,182
Claims priority, application Canada Mar. 8, 1961
18 Claims. (Cl. 214—1)

This invention relates to a device for individually positioning a plurality of cohesive nested containers on a supporting surface, and more particularly to a device for individually positioning a nested stack of deformable containers such as to the fluted paper cups which are used to hold and separate chocolates packed in a box.

In the chocolate industry, chocolates are normally packed in fluted paper cups and placed in boxes which pass in front of the packagers on a conveyor belt. The operation heretofore has been manually performed by a packager reaching for a chocolate with the right hand while the first two fingers of the left hand rub across a nested stack of paper cups held on the left thumb, thus removing one cup. The cup is then slid into the left palm. Meanwhile the right hand has grasped the chocolate and transported it to the cup. The right hand then positions the chocolate in the cup, grasps cup and chocolate and transports them to the proper position in the box. This time-consuming process is then repeated.

The work output of a packager can be substantially increased if the cups are preplaced in required position in the boxes, or on layer cards which are used to separate layers of chocolates in the boxes, thereby permitting the packagers to use both hands simultaneously to grasp and position chocolates in the cups in the boxes or in the cups on the layer cards.

In one of its aspects this invention relates to apparatus for individually positioning a plurality of cohesive nested containers on a supporting surface, including a support, a mandrel mounted on said support and rotatable relative thereto, said mandrel being adapted to be inserted within and to frictionally engage a selected endmost container of said nest, said mandrel and said nest being capable of movement toward and retraction from said supporting surface; and means for rotating said mandrel to break the cohesion between the opposite endmost container and the penultimate container adjacent thereto in said nest when the mandrel and the nest are moved toward the supporting surface, said opposite endmost container remaining on said supporting surface upon said retraction of the mandrel.

In another of its aspects this invention relates to a device for individually positioning a plurality of cohesive nested containers on a supporting surface, including a support, a mandrel mounted on said support and rotatable relative thereto, said mandrel being adapted to be inserted within and to frictionally engage a selected endmost container of said nest, said mandrel and said nest being capable of movement toward and retraction from said supporting surface, and means for imparting rotation to said mandrel to break the cohesion between the opposite endmost container and the penultimate container adjacent thereto in said nest when said opposite endmost container is in contact with said supporting surface said opposite endmost container remaining on the supporting surface upon said retraction of the mandrel.

In drawings which illustrate embodiments of the invention:

FIGURE 1 is a perspective view of one embodiment;

FIGURE 2 is an exploded perspective view of the embodiment shown in FIGURE 1;

FIGURE 3 is a part sectional elevation view of another embodiment;

FIGURE 3A is a plan view of the plate referred to in conjunction with FIGURES 3 and 6;

FIGURE 4 is a part sectional elevation view of another embodiment;

FIGURE 5 is an enlarged elevation view of a pair of wedges shown in FIGURE 4;

Figure 6:
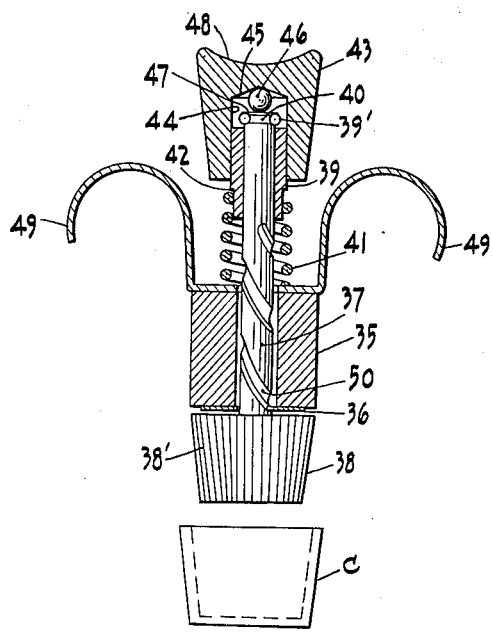
FIGURE 6 is a part sectional elevation view of another embodiment.

The embodiment of the invention illustrated in FIGURES 1 and 2 comprises a support or guide tube 10 open at both ends and with an outwardly extending annular flange at its lower end 11. Disposed within the guide tube 10 is a reciprocally movable shaft or plunger 12 the lower end of which projects a predetermined distance beyond the lower end 11 of the guide tube 10. Secured to the lower end of the plunger 12 is a mandrel 13. A predetermined portion of the outer periphery of the mandrel 13 is preferably of hard rubber 14 with serrations 14'. A pin 16' extends outwardly from the plunger 12 and engages a spiral slot 15 of predetermined length formed in the guide tube 10, the width of the slot being substantially equal to the diameter of the pin 16'. Coaxially disposed about the plunger 12 and located between the mandrel 13 and the lower end 11 of the guide tube 10, is a coil spring 16 with its upper end bearing on the underside of the annular flange at the lower end 11 of the guide tube 10 and with its lower end bearing on the mandrel 13. The mandrel is adapted to be inserted within and to engage frictionally the uppermost cup in the nested stack of fluted paper cups C. The stack of cups C are held in nested relationship by the frictional cohesion which exists between adjacent cups in the stack. The strength of the friction grip of the mandrel 13 on the uppermost cup should be greater than the cohesion between the lowermost cup and the adjacent penultimate cup in the stack.

The guide tube 10 is held fixed, relative to the other parts of the device, by hand or by machine and thus gripped, and with the mandrel 13 inserted in the uppermost cup of the stack of cups C, the device is moved toward the supporting surface on which the cups are to be individually positioned. When the stack of cups C touches the supporting surface the mandrel 13 is forced toward the lower end 11 of the guide tube 10 and the coil spring 16 is compressed. At the same time the plunger 12 moves upwardly and the pin 16', following the course of the spiral slot 15, rotates the plunger 12 thereby rotating the mandrel 13. The stack of cups C held by the mandrel 13, rotates with the mandrel 13 with the exception of the lowermost cup which is restrained by the friction between itself and the supporting surface. The cohesion between the lowermost cup and the adjacent penultimate cup is thereby broken. When the device is withdrawn the lowermost cup is left behind on the supporting surface and the coil spring 16 reasserts itself thereby returning the mandrel 13 to its original position relative to the lower end 11 of the guide tube 10.

The embodiment of the invention illustrated in FIGURE 3 comprises a guide tube 17 closed at its upper end 18 and open at its lower end where it has an outwardly extending annular flange 19. A coaxially disposed centrally bored spacer washer 23 is mounted within the guide tube 17 a predetermined distance from its lower end. The lower end of the guide tube 17 is provided with a centrally bored plate 20 fast therewith. Disposed within the bores of the spacer washer 23 and the plate 20 is a reciprocally movable shaft or plunger 22 the lower end of which projects a predetermined distance beyond the plate 20. Detachably secured to the lower end of the plunger 22 is a mandrel 24 of frustro-conical cross section which is retained in position by means of a lock nut 21.

The outer periphery of the mandrel 24 is preferably of hard rubber with serrations 24'. Coaxially disposed about the plunger 22 and located between the mandrel 24 and the plate 20 is a coil spring 25 having its upper end secured to the plate 20 and its lower end secured to the mandrel 24. A cam 20' (see FIGURE 3A) on the plate 20 extends into the bore therethrough and engages a spiral slot 26 of predetermined length and width in the plunger 22.

The guide tube 17 is held fixed, relative to the other parts of the device, by hand or by machine and, with the mandrel 24 inserted in the uppermost cup of the stack of cups C, the device, thus gripped, functions in a manner similar to that already disclosed with respect to the embodiment of FIGURES 1 and 2 with the exception that rotation of the mandrel 24 is occasioned by the interaction of the cam and the spiral slot 26 when the mandrel 24 is forced toward the lower end of the guide tube 17.

The embodiment of the invention illustrated in FIGURE 4 comprises a guide tube 27 closed at its upper end 28 and open at its lower end where it has an outwardly extending annular flange 29. Disposed within the guide tube 27 is a reciprocally movable shaft or plunger 30 the lower end of which projects a predetermined distance beyond the lower end of the guide tube 27. Secured to the lower end of the plunger 30 is an mandrel 31 of frustro-conical cross section. The outer periphery of the mandrel 31 is preferably of hard rubber with serrations 31'. An upper wedge 32 is secured to the lower surface of the flange 29 adjacent the periphery thereof, and a lower wedge 33 is secured to the upper surface of the mandrel 31 adjacent the periphery thereof. Wedges 31 and 32 are slightly offset (see FIGURE 5) and are adapted to make sliding contact along their hypotenuse sides 32' and 33' respectively. The device can include as many such pairs of wedges as are desired and feasible. In the embodiment illustrated (see FIGURE 4) two such pairs of wedges are shown. Two strips of soft rubber 34 of rectangular cross section are disposed between the lower end of the guide tube 27 and the upper surface of the mandrel 31. The upper end of each rubber strip 34 is secured to lower end of the guide tube 27 and the lower end of each rubber strip 34 is secured to the upper surface of the mandrel 31.

The guide tube 27 is held fixed, relative to the other parts of the device, by hand or by machine, and, with the mandrel 31 inserted in the uppermost cup of the stack of paper cups C, the device, thus gripped, functions in a manner similar to that already disclosed with respect to the embodiment of FIGURES 1 and 2 with the exception that rotation of the mandrel 31 is occasioned by the sliding contact of the sides 32' and 33' of the wedges 32 and 33. The rubber strips 34 are preferably spiralled counter to the direction of rotation of the mandrel 31 when the latter moves toward the lower end of the guide tube 27.

The embodiment of the invention illustrated in FIGURE 6 comprises a guide tube 35 open at both ends and provided with a centrally bored plate 36 fast to the lower end thereof. Disposed within the guide tube 35 and extending a predetermined distance beyond the upper and lower ends thereof is a reciprocally movable shaft or plunger 37. A mandrel 38 of frustro-conical cross section is secured to the lower end of the plunger 37. The outer periphery of the mandrel 38 is preferably of hard rubber with serrations 38'. A sleeve 39 is slidably mounted on the upper end of the plunger 37. A snap-ring 39' fits into a groove 40 in the upper end of the plunger 37 to limit the extent of upward movement of the sleeve 39. A coil spring 41 disposed about the plunger 37 has its upper end bearing on the sleeve 39 and its lower end bearing on the guide tube 35. The sleeve 39 has a reduced lower end about which the upper end of the coil spring 41 is disposed, said reduced end forming a seating 42 for the upper end of said spring.

A thumb member 43, provided with an internal bore 44, serves to house the upper end of the sleeve 39 and hence the upper end of the plunger 37, said upper ends being spaced a predetermined distance from the closed end of the bore 44. The sleeve 39 and the thumb member 43 are secured together for relative movement. The upper end of the bore 43 provides a conical seating 45 for a ball bearing 46 which, as will be described hereinafter, serves as a thrust ball. The ball bearing 46 is thus located between the conical seating 45 and the face 47 of the upper end of the plunger 37.

The thumb member 43 is provided with a curved depression 48 in its upper surface for engagement by the operator's thumb. Two diametrically opposed finger grips 49 extend outwardly from the upper end of the guide tube 35.

A cam 20' (see FIGURE 3A) in the plate 36 extends inwardly into the bore therethrough and engages a spiral slot 50 in the plunger 37.

In operation, the operator holds the device by the finger grips 49 and presses with his thumb against the thumb member 43 which pressure is imparted to the plunger 37 through the ball bearing 46. While the pressure is continued the unit comprising the thumb member 43, the ball bearing 46, the sleeve 39, the snap-ring 39' the plunger 37 and the mandrel 38 moves downward and the coil spring 41 is compressed. The interaction of the cam and the slot 50 imparts rotation to the plunger 37 and hence to the mandrel 38 during movement of the said unit. The lowermost cup of the stack of cups C is deposited on the supporting surface in a manner similar to that already described with reference to the other embodiments of the invention.

Figure 7:
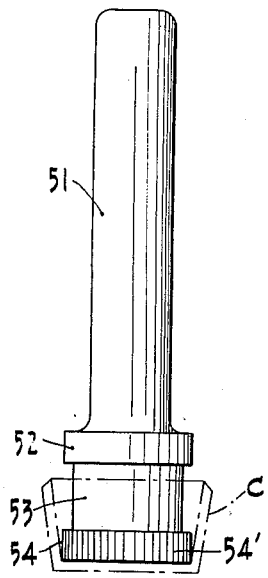
FIGURE 7 is a perspective view of another embodiment.

The embodiment of the invention illustrated in FIGURE 7 comprises a shaft 51 with an outwardly extending annular flange at its lower end 52. A mandrel 53 is secured to the lower end 52 of the shaft 51 and a predetermined portion of the outer periphery of the mandrel 53 is preferably of hard rubber 54 with serrations 54'.

With the mandrel 53 inserted in the uppermost cup of the stack of cups C, the shaft 51 is gripped by the operator and the device is moved toward the supporting surface on which the cups are to be individually positioned. When the stack of cups C touches the supporting surface, the operator, with a slight rotating finger motion, rotates the mandrel 53 by twisting the shaft 51. The grip between the lowermost cup and the adjacent penultimate cup is broken as has been described with respect to the embodiment of FIGURES 1 and 2 and the lowermost cup is left behind on the supporting surface when the device is withdrawn.

With reference to the embodiments of the invention described it is preferable that the supporting surface be a friction surface such as an adhesive surface or a roughened or abrasive surface held in fixed position relative to the device to restrain the lowermost cup of the stack of cups C from rotating with the mandrel and with the remainder of the cups when said lowermost cup contacts the supporting surface. A friction surface will also serve to retain the lowermost cup in the desired position thereon.

I claim:

1. Apparatus for individually positioning a plurality of cohesive nested containers on a supporting surface, including a support, a mandrel mounted on said support and rotatable relative thereto, said mandrel being adapted to be inserted within and to frictionally engage a selected endmost container of said nest, said mandrel and said nest being capable of movement toward and retraction from said supporting surface; and means for rotating said mandrel to break the cohesion between the opposite endmost container and the penultimate container adjacent thereto in said nest when the mandrel and the nest are moved toward the supporting surface, said opposite endmost container remaining on said supporting surface upon said retraction of the mandrel.

2. Apparatus for individually positioning a plurality of cohesive nested containers on a supporting surface, including a support, an mandrel mounted on said support and rotatable relative thereto, said mandrel being adapted to be inserted within and to frictionally engage a selected endmost container of said nest, said mandrel and said nest being capable of movement toward and retraction from said supporting surface; and means for rotating said mandrel to break the cohesion between the opposite endmost container and the penultimate container adjacent thereto in said nest when said opposite endmost container is in contact with said supporting surface, said opposite endmost container remaining on said supporting surface upon said retraction of the mandrel.

3. A device for individually positioning a plurality of cohesive nested containers on a supporting surface including a support, a mandrel mounted on said support and rotatable relative thereto, said mandrel being adapted to be inserted within and to frictionally engage a selected endmost container of said nest, said mandrel and said nest being capable of movement toward and retraction from said supporting surface, and means for imparting rotation to said mandrel to break the cohesion between the opposite endmost container and the penultimate container adjacent thereto in said nest when said opposite endmost container is in contact with said supporting surface said opposite endmost container remaining on the supporting surface upon said retraction of the mandrel.

4. A device for individually positioning a plurality of cohesive nested containers on a supporting surface, including a support, a shaft mounted on said support and rotatable relative thereto, a mandrel on the lower end of said shaft, said mandrel being adapted to be inserted within and to frictionally engage a selected endmost container of said nest, said mandrel and said nest being capable of movement toward and retraction from said supporting surface, and means for imparting rotation to said mandrel to break the cohesion between the opposite endmost container and the penultimate container adjacent thereto in said nest when said opposite endmost container is in contact with said supporting surface said opposite endmost container remaining on the supporting surface upon said retraction of the mandrel.

5. A device for individually positioning a plurality of cohesive nested containers on a supporting surface, comprising a guide tube, a reciprocally movable plunger disposed within said guide tube and rotatable relative thereto, with its lower end extending beyond the lower end of the guide tube, a mandrel on the lower end of the plunger, the outer periphery of said mandrel being of serrated hard rubber adapted to be inserted within and to frictionally engage a selected endmost container of said nest, said mandrel and said nest being capable of movement toward and retraction from said supporting surface, and means for imparting rotation to said mandrel to break the cohesion between the opposite endmost container and the penultimate container adjacent thereto in said nest when said opposite endmost container is in contact with said supporting surface, said opposite endmost container remaining on the supporting surface upon said retraction of the mandrel.

6. A device for individually positioning a plurality of cohesive nested paper cups or the like on a fixed friction surface comprising a fixed guide tube outwardly flanged at its lower end, a reciprocally movable plunger disposed within said guide tube and rotatable relative thereto, with its lower end extending beyond the lower end of the guide tube, a mandrel on the lower end of said plunger, the outer periphery of said mandrel being of serrated hard rubber adapted to be inserted within and to frictionally engage a selected endmost cup of said nest, said mandrel and said nest being capable of movement toward and retraction from said fixed friction surface, a coil spring coaxially disposed about said plunger with its upper end bearing on the lower end of the guide tube and its lower end bearing on the mandrel, a spiral slot of predetermined length in said guide tube, a pin extending outwardly from said plunger and engaging said slot, said pin and slot being adapted to impart rotation to said plunger and hence to said mandrel when the nest of paper cups touches the fixed friction surface forcing the mandrel toward the lower end of the guide tube, said rotation thereby breaking the cohesion between the opposite endmost cup and the penultimate cup adjacent thereto in said nest, said opposite endmost cup remaining on the fixed friction surface upon said retraction of the mandrel.

7. A device for individually positioning a plurality of cohesive nested paper cups or the like on a fixed friction surface comprising a fixed guide tube closed at its upper end and open at its lower end, a bored spacer washer coaxially secured within the guide tube a predetermined distance from the lower end thereof, a centrally bored plate fast to the lower end of the guide tube, a reciprocally movable plunger disposed within the bores of the spacer washer and the plate, the lower end of said plunger projecting a predetermined distance beyond said plate, a mandrel detachably secured to the lower end of said plunger, the outer periphery of said mandrel being of serrated hard rubber adapted to be inserted within and to frictionally engage a selected endmost cup of said nest, said mandrel and said nest being capable of movement toward and retraction from said fixed friction surface, a coil spring coaxially disposed about said plunger, the upper end of the coil spring being secured to the plate and the lower end of the coil spring being secured to the mandrel, a spiral slot of predetermined length in said plunger, a cam on said plate extending into the bore therethrough adapted to engage said slot, said cam and said slot being adapted to impart rotation to said plunger and hence to said mandrel when the nest of paper cups touches the fixed friction surface forcing the mandrel toward the lower end of the guide tube, said rotation thereby breaking the cohesion between the opposite endmost cup and the penultimate cup adjacent thereto in said nest, said opposite endmost cup remaining on the fixed friction surface upon said retraction of the mandrel.

8. A device according to claim 7 in which the mandrel is of frustro-conical cross section.

9. A device for individually positioning a plurality of cohesive nested paper cups or the like on a fixed friction surface, comprising a fixed guide tube closed at its upper end and open at its lower end, an outwardly extending flange on the lower end of the guide tube, a reciprocally movable plunger disposed within said guide tube with its lower end extending beyond the lower end of the guide tube, a mandrel secured to the lower end of said plunger, the outer periphery of said mandrel being of serrated hard rubber adapted to be inserted within and to frictionally engage a selected endmost cup of said nest, said mandrel and said nest being capable of movement toward and retraction from said fixed friction surface, resilient means disposed between the lower end of the guide tube and the mandrel, the upper end of said resilient means being secured to the lower end of the guide tube and the lower end of said resilient means being secured to the mandrel, an upper wedge secured to the said flange, a lower wedge secured to said mandrel, said wedges being adapted to make sliding contact with each other when the nest of paper cups touches the fixed friction surface forcing the mandrel toward the lower end of the guide tube, said sliding contact imparting rotation to said mandrel, said rotation thereby breaking the cohesion between the opposite endmost cup and the penultimate cup adjacent thereto in said nest, said opposite endmost cup remaining on the fixed friction surface upon said retraction of the mandrel.

10. A device according to claim 9 in which the resilient means is at least one strip of soft rubber of rectangular cross section.

11. A device according to claim 9 in which the mandrel is of frustro-conical cross section.

12. A device according to claim 10 in which the strip of soft rubber is spiralled counter to the direction of rotation of the mandrel when the mandrel moves toward the lower end of the guide tube.

13. A device for individually positioning a plurality of cohesive nested paper cups or the like on a fixed friction surface, comprising a guide tube open at its upper and lower ends, a centrally bored plate fast to the lower end of the guide tube, a reciprocally movable plunger disposed within the guide tube and extending a predetermined distance beyond the upper and lower ends thereof, a mandrel secured to the lower end of the plunger, the outer periphery of said mandrel being of serrated hard rubber adapted to be inserted within and to frictionally engage a selected endmost cup of said nest, said mandrel and said nest being capable of movement toward and retraction from said fixed friction surface, a sleeve slidably mounted on the upper end of the plunger, means to limit the extent of upward movement of the sleeve, a coil spring disposed about the plunger with its upper end bearing on the sleeve and its lower end bearing on the guide tube, an internally bored thumb member housing the upper ends of the sleeve and the plunger, said thumb member being secured to the sleeve for relative movement, an upper surface on said thumb member, means disposed within the bore of said thumb member between the upper surface thereof and the face of the upper end of said plunger adapted to impart pressure on the upper surface of the thumb member to the plunger, two substantially diametrically opposed finger grips extending outwardly from said guide tube, a spiral slot of predetermined length in said plunger, a cam on said plate extending into the bore therethrough adapted to engage said slot, said cam and said slot being adapted to impart rotation to said plunger and hence to said mandrel when pressure on the upper surface of the thumb member moves the plunger downward, said rotation thereby breaking the cohesion between the opposite endmost cup and the penultimate cup adjacent thereto in said nest when said opposite endmost cup contacts said fixed friction surface, said opposite endmost cup remaining on the fixed friction surface upon said retraction of the mandrel.

14. A device according to claim 13 in which the means to limit the extent of upward movement of the sleeve comprises a groove in the upper end of the plunger and a snap ring disposed within said groove.

15. A device according to claim 13 in which the means disposed within the bore of said thumb member between the upper surface thereof and the face of the upper end of said plunger is a ball bearing.

16. A device according to claim 13 in which the upper surface of the thumb member is provided with a curved depression for manual engagement by the operator's thumb.

17. A device according to claim 13 in which the mandrel is of frustro-conical cross section.

18. A device according to claim 15 in which the thumb member bore provides a conical seating for the ball bearing.

References Cited in the file of this patent

UNITED STATES PATENTS

| | | |
|---|---|---|
| 1,178,147 | Gardner | Apr. 4, 1916 |
| 2,157,563 | Pethick | May 9, 1939 |

FOREIGN PATENTS

| | | |
|---|---|---|
| 834,844 | Germany | Mar. 24, 1952 |